(12) United States Patent
Yasue et al.

(10) Patent No.: US 11,472,082 B2
(45) Date of Patent: Oct. 18, 2022

(54) MOLDING METHOD AND MOLDING APPARATUS OF MOLDED ARTICLE COMPRISING FIBER-REINFORCED THERMOPLASTIC RESIN

(71) Applicant: THE JAPAN STEEL WORKS, LTD., Tokyo (JP)

(72) Inventors: Akira Yasue, Hiroshima (JP); Hideki Chiba, Hiroshima (JP); Daisuke Kunihiro, Hiroshima (JP); Shoso Nishida, Hiroshima (JP); Kazuya Tsuji, Hiroshima (JP); Yasufumi Fujita, Hiroshima (JP); Kazuki Fujita, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 183 days.

(21) Appl. No.: 16/649,472

(22) PCT Filed: Sep. 21, 2018

(86) PCT No.: PCT/JP2018/035171
§ 371 (c)(1),
(2) Date: Mar. 20, 2020

(87) PCT Pub. No.: WO2019/059371
PCT Pub. Date: Mar. 28, 2019

(65) Prior Publication Data
US 2020/0298457 A1 Sep. 24, 2020

(30) Foreign Application Priority Data
Sep. 21, 2017 (JP) .............................. JP2017-180833

(51) Int. Cl.
*B29C 45/56* (2006.01)
*B29C 43/34* (2006.01)
(Continued)

(52) U.S. Cl.
CPC ............ *B29C 45/561* (2013.01); *B29C 43/34* (2013.01); *B29C 35/16* (2013.01); *B29C 43/52* (2013.01);
(Continued)

(58) Field of Classification Search
None
See application file for complete search history.

(56) References Cited

U.S. PATENT DOCUMENTS 5,868,890 A 2/1999 Fredrick
6,099,949 A 8/2000 Nomura et al.
(Continued)

FOREIGN PATENT DOCUMENTS

CN 1210065 A 3/1999
CN 1850490 A 10/2006
(Continued)

OTHER PUBLICATIONS

Machine English Translation of JPH04259510, Accessed Nov. 12, 2021 (Year: 1992).*
(Continued)

*Primary Examiner* — Francisco W Tschen
*Assistant Examiner* — Adrianna N Konves
(74) *Attorney, Agent, or Firm* — Sughrue Mion, PLLC

(57) ABSTRACT

The present invention addresses the problem of providing a molding method capable of molding a molded article having excellent strength and reducing manufacturing costs by shortening a molding cycle when obtaining a molded article from a fiber-reinforced thermoplastic resin by compression molding. The present invention relates to a molding method which obtains a fiber-reinforced thermoplastic resin by kneading a thermoplastic resin and a reinforcing fiber (14), and a molded article from the fiber-reinforced thermoplastic resin by compression molding. The molding method of the (Continued)

molded article comprising the fiber-reinforced thermoplastic resin according to the present invention comprises: a molding step for obtaining a first molded article from a predetermined amount of a fiber-reinforced thermoplastic resin through a molding die (4); a carrying-in step for opening the molding die (4), taking out the first molded article, and inserting the first molded article into a cooling die (5); and a compression cooling step for cooling the first molded article by compressing the first molded article through the cooling die (5).

8 Claims, 1 Drawing Sheet

(51) Int. Cl.
    *B29C 35/16* (2006.01)
    *B29C 43/52* (2006.01)
    *B29K 101/12* (2006.01)
    *B29K 105/06* (2006.01)

(52) U.S. Cl.
    CPC ...... *B29K 2101/12* (2013.01); *B29K 2105/06* (2013.01)

(56) References Cited

U.S. PATENT DOCUMENTS

| | | | |
|---|---|---|---|
| 6,186,769 | B1 | 2/2001 | Hawley |
| 6,210,147 | B1 | 4/2001 | Mori et al. |
| 2008/0067704 | A1 | 3/2008 | Ohmori et al. |
| 2015/0151467 | A1 | 6/2015 | Griffing |
| 2015/0151495 | A1 | 6/2015 | Fisher, Jr. |
| 2016/0009010 | A1 | 1/2016 | Kariya et al. |
| 2016/0089822 | A1 | 3/2016 | Oda |
| 2016/0101543 | A1 | 4/2016 | Fisher, Jr. et al. |
| 2017/0050359 | A1 | 2/2017 | Higuchi et al. |
| 2017/0057126 | A1 | 3/2017 | Anderle et al. |
| 2017/0197343 | A1 | 7/2017 | Wenzel |
| 2020/0016796 | A1 | 1/2020 | Fisher, Jr. et al. |

FOREIGN PATENT DOCUMENTS

| | | |
|---|---|---|
| CN | 102101362 A | 6/2011 |
| CN | 104669640 A | 6/2015 |
| EP | 1 260 347 A2 | 11/2002 |
| EP | 2 737 987 A2 | 6/2014 |
| FR | 2646631 A1 | 11/1990 |
| JP | 3-2010 A | 1/1991 |
| JP | 4-259510 A | 9/1992 |
| JP | 5-131479 A | 5/1993 |
| JP | 8-207098 A | 8/1996 |
| JP | 10-86188 A | 4/1998 |
| JP | 11-10673 A | 1/1999 |
| JP | 2006-110920 A | 4/2006 |
| JP | 2016-64607 A | 4/2016 |
| JP | 2016-144942 A | 8/2016 |
| JP | 2017-39243 A | 2/2017 |
| WO | 2009/096606 A1 | 8/2009 |

OTHER PUBLICATIONS

International Search Report (PCT/ISA/210) dated Oct. 16, 2018 issued by the International Searching Authority in International Application No. PCT/JP2018/035171.

Written Opinion (PCT/ISA/237) dated Oct. 16, 2018 issued by the International Searching Authority in International Application No. PCT/JP2018/035171.

Office Action dated Jan. 25, 2021, issued by the Japanese Patent Office in corresponding Japanese English patent application No. 2017-180833.

Communication dated May 7, 2021 issued by the State Intellectual Property Office of P.R. China in counterpart Chinese Application No. 201880060872.3.

Search Report dated May 20, 2021 by the European Patent Office in counterpart European Patent Application No. 18859529.2.

Communication dated Dec. 24, 2021, from The China National Intellectual Property Administration in Application No. 201880060872.3.

\* cited by examiner

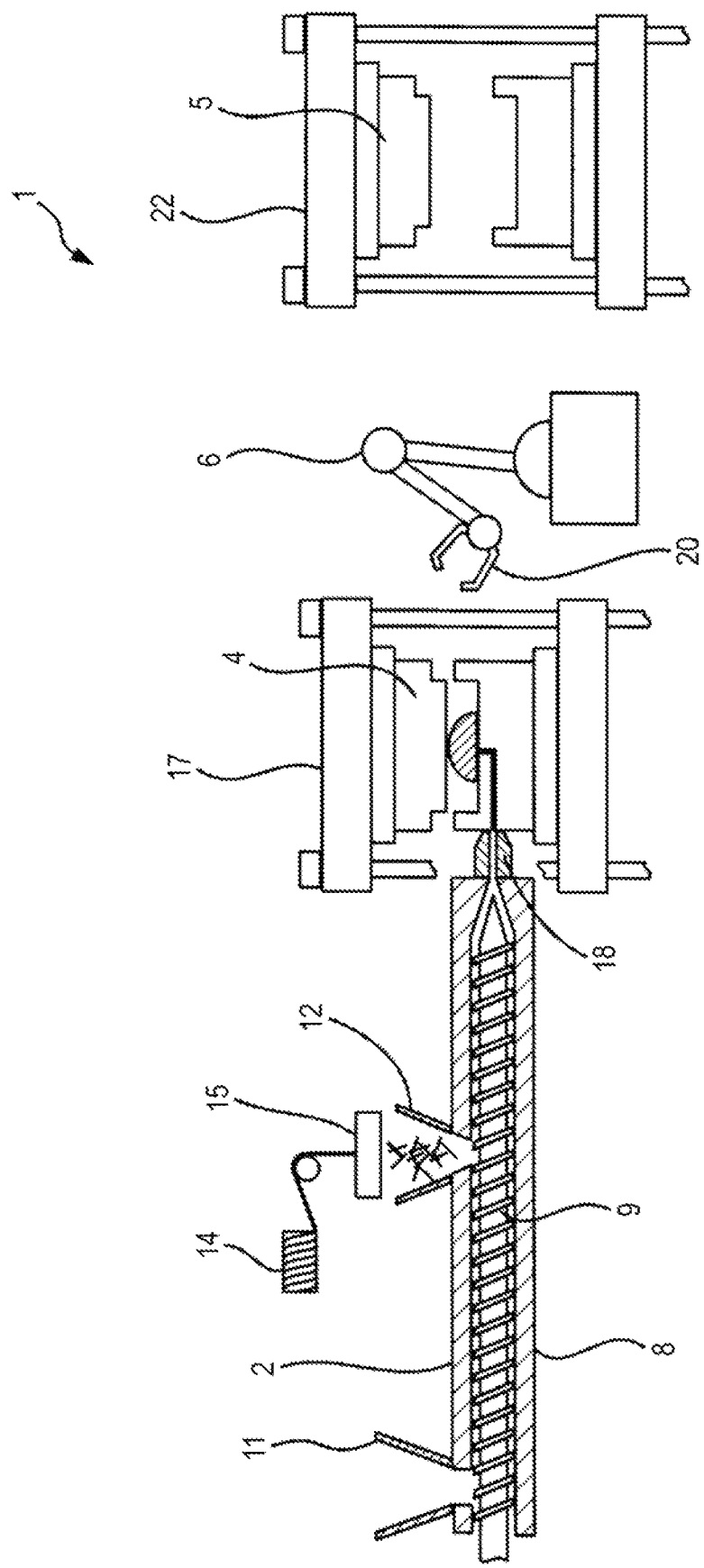

MOLDING METHOD AND MOLDING APPARATUS OF MOLDED ARTICLE COMPRISING FIBER-REINFORCED THERMOPLASTIC RESIN

TECHNICAL FIELD

The present invention relates to a molding method for molding a molded article from a fiber-reinforced thermoplastic resin in which a reinforcing fiber such as carbon fibers and glass fibers in a thermoplastic resin are mixed at a predetermined ratio, and a molding apparatus for molding a molded article made of a fiber-reinforced thermoplastic resin.

BACKGROUND ART

A molded article made of a composite material containing a reinforcing fiber such as carbon fibers and glass fibers and a resin has high strength and is used in various fields. For example, so-called FRP (Fiberglass Reinforced Plastics) used in a hull of a small vessel, a tank of a cistern, or the like are molded from a reinforcing fiber sheet and a thermosetting resin, and are cured by heating. The FRP have an excellent advantage that a relatively large molded article can be molded, but there is also a problem of productivity. The FRP can be molded by various methods, for example, by a method with relatively high productivity of obtaining the reinforcing fiber sheet impregnated with the thermosetting resin, namely a prepreg, and then molding a molded article, but in general, time required for molding is long and a production cost is high. In contrast, when the molded article is molded from the fiber-reinforced thermoplastic resin obtained by mixing the thermoplastic resin as a base material and the reinforcing fiber, for example, the molding is performed by injection molding or press molding, but there is merit that the molding can be performed in a short time, and the production cost is low.

The method for molding the molded article from the fiber-reinforced thermoplastic resin by an extruder is described in various literatures such as PTL 1 and is well-known. It will be described briefly. The thermoplastic resin is melted by a single screw extruder or a twin-screw extruder. The reinforcing fiber is fed into a cylinder at a predetermined position of the cylinder of the extruder and is mixed to form a fiber-reinforced thermoplastic resin. The fiber-reinforced thermoplastic resin is extruded from dies to obtain a massive molded product having a predetermined size, which is carried to a mold. The molded article is obtained by compressing and molding the massive molded product. The method for molding the molded article from the fiber-reinforced thermoplastic resin by an injection molding machine is also well-known. First, the fiber-reinforced thermoplastic resin is weighed by melting reinforcing fiber filled pellets. Alternatively, the thermoplastic resin and the reinforcing fiber are separately supplied and melted and mixed in an injection molding machine to obtain the fiber-reinforced thermoplastic resin. The fiber-reinforced thermoplastic resin is injected into a clamped mold. Alternatively, the fiber-reinforced thermoplastic resin is injected into a mold opened by a predetermined amount, and the molded article is obtained by compression molding by mold clamping.

CITATION LIST

Patent Literature

PTL 1: JP-A-2016-64607

SUMMARY OF INVENTION

Technical Problem

In a case where the thermoplastic resin and the reinforcing fiber are kneaded in an extruder or an injection molding machine to obtain the fiber-reinforced thermoplastic resin, and the fiber-reinforced thermoplastic resin is molded by a mold, there is merit that the molded article can be obtained in a relatively short time and the production cost is low. However, the problem to be solved is also observed. First, there is a problem, particularly when molding is performed by compression molding. If a mold clamping force is increased in the compression molding, the fibers touch each other and the reinforcing fiber is broken, which affects the strength of the molded article. If compression molding from the fiber-reinforced thermoplastic resin is carried out at a relatively low mold temperature, viscosity of the resin increases and a shearing force increases, and inevitably, a large mold clamping force is required to be applied, so that said problem occurs. Such breaking of reinforcing fiber can be prevented to some extent if the mold is at a high temperature to ensure fluidity of the resin. That is, the mold clamping force in the compression molding can be made relatively small, and breaking of the reinforcing fiber can be reduced. If the compression molding is not performed, that is, in a molding method of injection into the clamped mold, it is preferable to make the mold at a high temperature since the fluidity of the resin can be ensured. However, when the mold is at a high temperature as described above, it takes time to cool the molded article, and there is a problem that a molding cycle is long and the production cost is large. When the molded article is taken out in a high temperature state in order to shorten the molding cycle, there is also a problem that a warp occurs.

Incidentally, as will be described later, the present inventors have discovered a phenomenon where sufficient strength is not obtained when the molded article is obtained from the fiber-reinforced thermoplastic resin in the same manner as a general molded article containing no reinforcing fiber. In a case of injection molding and compression molding using a general resin containing no reinforcing fiber as a material, the molded article is taken out from the mold in a relatively high temperature state. This is to shorten the molding cycle and reduce the production cost. For example, when a molded article is obtained from nylon 6, the molded article can be taken out when cooled to about 140° C. in the mold. However the present inventors have found a phenomenon that sufficient strength is not obtained in the molded article when the molded article made of the fiber-reinforced thermoplastic resin is taken out from the mold at the same temperature. That is, there is a problem that sufficient strength is not obtained even though the molded article is obtained from the fiber-reinforced thermoplastic resin.

Therefore, an object of the present invention is to provide a molding method capable of molding a molded article having large strength though a production cost can be reduced by shortening a molding cycle when the molded article is obtained from a fiber-reinforced thermoplastic resin by compression molding. Another object of the present invention is to provide a molding apparatus for molding a molded article made of a fiber-reinforced thermoplastic resin capable of carrying out such a molding method.

Solution to Problem

The present invention relates to a molding method, which obtains a fiber-reinforced thermoplastic resin by kneading a thermoplastic resin and a reinforcing fiber, and which obtains a molded article from the fiber-reinforced thermoplastic resin. The molding method of the present invention includes: a molding step of molding from a predetermined amount of the fiber-reinforced thermoplastic resin through a molding mold to obtain the molded article; a carrying step of opening the molding mold, taking out the molded article, and inserting the molded article into a cooling mold; and a compression cooling step of compressing and cooling the molded article through the cooling mold.

That is, the present invention includes configurations of the following (1) to (4).

(1) A molding method of a molded article made of a fiber-reinforced thermoplastic resin, which obtains the fiber-reinforced thermoplastic resin by kneading a thermoplastic resin and a reinforcing fiber, and which obtains the molded article from the fiber-reinforced thermoplastic resin, the molding method comprising: a molding step comprising obtaining a primary molded article from a predetermined amount of the fiber-reinforced thermoplastic resin by a molding mold; a carrying step comprising opening the molding mold, taking out the primary molded article, and inserting the primary molded article into a cooling mold; and a compression cooling step comprising compressing and cooling the primary molded article by the cooling mold.

(2) The molding method of a molded article made of a fiber-reinforced thermoplastic resin according to the above (1), wherein in the molding step, the fiber-reinforced thermoplastic resin is injected while the molding mold is opened, or a predetermined amount of the fiber-reinforced thermoplastic resin is inserted while the molding mold is opened, and thereafter molding is performed by compression molding.

(3) A molding apparatus for molding a molded article from a fiber-reinforced thermoplastic resin in which a thermoplastic resin and a reinforcing fiber are kneaded, the molding apparatus comprising: a plasticizing device comprising an extruder or an injection molding machine configured to knead the thermoplastic resin and the reinforcing fiber to obtain the fiber-reinforced thermoplastic resin; a molding mold molding a primary molded article from a predetermined amount of the fiber-reinforced thermoplastic resin: a carrying device; and a cooling mold, wherein the primary molded article molded in the molding mold is taken out by the carrying device and is carried to the cooling mold, and is compressed and cooled in the cooling mold.

(4) The molding apparatus for molding a molded article from a fiber-reinforced thermoplastic resin according to the above (3), wherein the molding mold comprises a mold for compression molding, and wherein a predetermined amount of the fiber-reinforced thermoplastic resin is injected or inserted while the molding mold is opened, and is thereafter compressed by the molding mold.

Advantageous Effects of Invention

As described above, the present invention relates to a molding method which obtains a fiber-reinforced thermoplastic resin by kneading a thermoplastic resin and a reinforcing fiber and obtains a molded article from the fiber-reinforced thermoplastic resin. That is, the present invention relates to a molding method having a short molding cycle and a low production cost. The molding method of the present invention includes: a molding step of obtaining a primary molded article from a predetermined amount of the fiber-reinforced thermoplastic resin through a molding mold; a carrying step of opening the molding mold, taking out the molded article, and inserting the molded article into a cooling mold; and a compression cooling step of compressing and cooling the molded article through the cooling mold. In a case the primary molded article is molded from the fiber-reinforced thermoplastic resin, there is a problem that strength of the molded article as a final product is not obtained if the molded article is taken out from the molding mold at a relatively high temperature. In the present invention, the primary molded article is compressed and cooled by the cooling mold. Hereby, the strength of the molded article can be increased as described in detail later regarding experiments conducted by the present inventors. If the primary molded article is just cooled, it is considered that molding is carried out with a molding mold for molding the primary molded article. However, in this case, the molding cycle is considerably long and the production cost increases. Since the cooling mold is provided separately from the molding mold in the molding method of the present invention, the molding cycle can be shortened and the production cost can be reduced. As is found by the experiment, the mold clamping force in the cooling mold may be smaller than the mold clamping force required for the molding mold, and for example, a mold clamping force of about $\frac{1}{10}$ is sufficient. Therefore, the cooling mold can be clamped even with a relatively small mold clamping device, and a cost of the entire molding apparatus can be reduced. Furthermore, it can be said that the molding method of the present invention is also advantageous in energy efficiency. If molding is carried out only with the molding mold, it is necessary to make the mold at a high temperature at the time of molding and to cool the mold forcibly at the time of cooling. That is, it is necessary to carry out heat and cool. Therefore, a large amount of energy is necessary. However, in the molding method of the present invention, the molding mold may be maintained at a relatively high temperature and the cooling mold may be maintained at a low temperature, and since it is not necessary to greatly change the temperatures of the molds, the energy efficiency is high.

According to other inventions, the molding step is configured to inject the fiber-reinforced thermoplastic resin while the molding mold is opened or insert the predetermined amount of the fiber-reinforced thermoplastic resin while the mold is opened, and thereafter mold the article by compression molding. In compression molding, it is important to maintain particularly the temperature of the molding mold at a high temperature since the reinforcing fibers touch each other and are easily broken during compression, the present invention that provides the cooling mold separately from the molding mold to carry out the compression cooling step can save time required for cooling, the energy efficiency is high, and the production cost can be reduced.

BRIEF DESCRIPTION OF DRAWINGS

FIG. 1 is a front view showing a molding apparatus according to an embodiment of the present invention.

DESCRIPTION OF EMBODIMENTS

Hereinafter, an embodiment of the present invention will be described. As shown in FIG. 1, the molding apparatus 1 according to the present embodiment includes a plasticizing device 2 configured to plasticize a thermoplastic resin and to mix it with a reinforcing fiber to obtain a fiber-reinforced thermoplastic resin, a molding mold 4 configured to perform compression molding from a predetermined amount of the fiber-reinforced thermoplastic resin to obtain a primary molded article, a cooling mold 5 configured to cool while compressing the molded primary molded article, and a carrying device 6 configured to take out the primary molded article from the molding mold 4 and to carry the primary molded article to the cooling mold 5.

The plasticizing device 2 is not a characteristic device in the present invention, and may be configured by an injection device of a related well-known injection molding machine or an extruder. In the present embodiment, the plasticizing device 2 is configured by an injection device of an injection molding machine. The injection device includes a heating cylinder 8 and a screw 9 driven in a rotation direction and an axial direction in the heating cylinder 8. The injection device is provided with a hopper 11, into which the thermoplastic resin is fed, is provided on a rear side of the heating cylinder 8, and with a reinforcing fiber charge chute 12 for charging the reinforcing fiber on a front side of the heating cylinder 8. Although the screw 9 is shown as being formed in a uniform shape whose flight crosses in the axial direction in FIG. 1, a screw groove is shallow on an upstream side of the reinforcing fiber charge chute 12 to compress the resin, and the screw groove is deep in the vicinity of the reinforcing fiber charge chute 12 to reduce resin pressure. Therefore, when the reinforcing fiber is supplied into the heating cylinder 8, the supply is not hindered by the resin pressure. A supply device of the reinforcing fiber, for example, carbon fibers, is provided corresponding to the reinforcing fiber charge chute 12. That is, there are provided a reinforcing fiber roll 14 where reinforcing fibers are twisted in a predetermined number to form a rope shape, namely roving is wound in a cylindrical shape and a cutting device 15 configured to cut the roving of the reinforcing fibers drawn out from the reinforcing fiber roll 14 at a predetermined length. The reinforcing fiber cut by the cutting device 15 is fed into the heating cylinder 8 from the reinforcing fiber charge chute 12 while being scattered.

In the present embodiment, the molding mold 4 is a mold for compression molding, in which the fiber-reinforced thermoplastic resin is injected while the mold is opened, and thereafter the fiber-reinforced thermoplastic resin is compressed thereby. The molding mold 4 is provided in the first mold clamping device 17. The first mold clamping device 17 may be clamped by a toggle mechanism, or may be clamped by a mold clamping cylinder. A cavity for molding the primary molded article is formed in the molding mold 4, and a resin is injected from a sprue provided on a side of the molding mold 4. A nozzle 18 of the plasticizing device 1 abuts on the sprue.

The carrying device 6 only needs to be able to: grip and take out the primary molded article molded in the molding mold 4; carry the primary molded article and insert it into the cooling mold 5. The carrying device 6 may be configured by a robot chuck or the like. In the present embodiment, the carrying device 6 includes a robot arm including a hand 20 configured to grip the primary molded article.

The cooling mold 5 according to the present embodiment is a characteristic component in the present invention. The cooling mold 5 is provided in a second mold clamping device 22, and is disposed in the vicinity of the first mold clamping device 17 and adjacent to the carrying device 6. A cavity for cooling the primary molded article is formed in the cooling mold 5, and a shape thereof is substantially the same as the cavity formed in the molding mold 4. The cooling mold 5 is cooled with a predetermined refrigerant, and is a water cooling type in the present embodiment. A type of a mold clamping mechanism of the second mold clamping device 22 is not particularly limited, and a clamping force larger than the first mold clamping device 17 is not required. Therefore, a relatively small mold clamping device can be included.

A method for molding a molded article from a fiber-reinforced thermoplastic resin by the molding apparatus 1 according to the present embodiment will be described. The molding method in the present embodiment is a molding method, which obtains a fiber-reinforced thermoplastic resin by kneading a thermoplastic resin and a reinforcing fiber, and which obtains a molded article from the fiber-reinforced thermoplastic resin, wherein the method includes: a molding step of obtaining the primary molded article from a predetermined amount of the fiber-reinforced thermoplastic resin through a molding mold; a carrying step of opening the molding mold, taking out the molded article, and inserting the molded article into a cooling mold; and a compression cooling step of compressing and cooling the molded article through the cooling mold.

First, the molding step is described. In the plasticizing device 2, namely the injection device, the heating cylinder 8 is heated by a heater (not shown in the drawings), the screw 9 is rotated, and pellets of the thermoplastic resin are fed from the hopper 11. The pellets are melt in the heating cylinder 8 and are sent forward. In parallel therewith, roving of the reinforcing fiber such as carbon fibers drawn out from the reinforcing fiber roll 14 is cut by the cutting device 15 and is fed from the reinforcing fiber charge chute 12. Then, the resin and the reinforcing fiber are kneaded in the heating cylinder 8 to form the fiber-reinforced thermoplastic resin, which is sent forward of the heating cylinder 8 to retract the screw 9. Namely, measurement is performed. The first mold clamping device 17 is driven to open the molding mold 4, The screw 9 is driven in the axial direction to perform injection. Then, as shown in FIG. 1, the fiber-reinforced thermoplastic resin is injected into the cavity of the molding mold 4 by a predetermined amount. The first mold clamping device 17 is driven to perform compression molding. The molding mold 4 is maintained at a relatively high temperature. For example, if a thermoplastic resin to be used is nylon 6, a mold temperature is set as 140° C. Therefore, the fiber-reinforced thermoplastic resin has sufficient fluidity in the cavity, and the reinforcing fiber is prevented from being broken by a shearing force in the compression molding. Further, since the fluidity is sufficiently high, the mold clamping force in the compression molding is relatively small in the first mold clamping device 17, and surface characteristics of the primary molded article are good.

In the carrying step, the primary molded article obtained in the molding step is transported into the cooling mold. Once the primary molded article has solidified, the molding mold 4 is opened without waiting until the article being sufficiently cooled. Since the molding mold 4 is maintained at a relatively high temperature, the primary molded article is in a state of a relatively high temperature. The carrying device 6 takes out the primary molded article and inserts it into the cavity of the cooling mold 5.

In the compression cooling step, the second mold clamping device 22 is driven to clamp the cooling mold 5. That is, the primary molded article is compressed, A mold temperature at the time of mold clamping with the cooling mold 5 is preferably equal to or lower than the mold temperature in the molding step, and more preferably equal to or lower than a glass transition temperature of a thermoplastic resin to be used. The cooling mold 5 is preferably compressed with a predetermined mold clamping force, for example, preferably in a range of 0.1 MPa to 20 MPa, and more preferably 1 MPa to 5 MPa. Springback of the fiber can be prevented when the mold clamping force is in the above range. Once the primary molded article has been sufficiently cooled, the mold is opened to take out the molded article as a final product.

The molding apparatus 1 according to the present embodiment may be modified in various ways. For example, the plasticizing device 2 may be replaced with an extruder as already described. Regarding the extruder, extrusion may be carried out from a single screw extruder including a single screw or a twin screw extruder including twin screws. In a case the extrusion is carried out by the extruder, the fiber-reinforced thermoplastic resin is extruded by a predetermined amount and cut to a massive molded product, which is carried to the cavity of the molding mold 4 for compression molding. The plasticizing device 2 may also be modified to use a plunger type injection device. Modifications in other points are also possible. For example, it is described in the present embodiment that the molded article is molded by compression molding. Alternatively, molding may be performed by injection into the clamped molding mold 4 by using an injection molding machine as the plasticizing device 2.

Other Modifications are also possible. For example, the reinforcing fiber to be supplied may also be modified. In the present embodiment, when the reinforcing fiber is fed into the reinforcing fiber charge chute 12, the reinforcing fiber is fed in a cut state, but may be fed without being cut. When the reinforcing fiber is fed without being cut, the reinforcing fiber is cut in the heating cylinder 8 by a shearing force due to rotation of the screw 9. In the molding apparatus 1 according to the present embodiment, the cooling mold 5 may also be modified. For example, although only one cooling mold 5 is provided in the present embodiment, a plurality of two or more of cooling molds 5 may be provided. When the plurality of cooling molds 5 are provided, the molded article molded by the molding mold 4 can be carried to appropriately vacant cooling molds 5 and cooled, and production efficiency can be improved.

EXAMPLES

An experiment was performed to confirm that a molded article made of a fiber-reinforced thermoplastic resin according to the present embodiment had high strength by a molding method thereof.
<Experiment Method>
In the molding apparatus 1 according to the present embodiment shown in FIG. 1, two molded articles A and B were molded using the plasticizing device 2 and the first mold clamping device 17. Molding conditions were as follows. A shape of the molded article was a slab of 300 mm×300 mm×3 mm. Nylon 6 was used as a thermoplastic resin, and carbon fibers were used as a reinforcing fiber. A proportion of the added reinforcing fiber was sets as 30% in volume ratio, that is, the reinforcing fiber was set as 30 to 70 of the thermoplastic resin in volume ratio. The fiber-reinforced thermoplastic resin was obtained by the plasticizing device 2 and injected into the molding mold 4 to perform compression molding. A temperature of the fiber-reinforced thermoplastic resin at the time of injection was set as 260° C., and a temperature of the molding mold 4 was adjusted to 140° C. Clamping pressure in the compression molding was set as 22 MPa, and mold clamping was carried out for 20 seconds. After the molding mold 4 was opened, regarding a molded article A, a primary molded article was carried or inserted to the cooling mold 5 by the carrying device 6, and the cooling mold 5 was clamped and cooled. The clamping pressure by the cooling mold 5 was 1.2 MPa, and mold clamping was carried out for 300 seconds. That is, the molded article A is molded by the molding method according to the embodiment of the present invention. On the other hand, regarding a molded article B, after the molding mold 4 was opened, the molded article was taken out and left. That is, the molded article B was molded by a related-art molding method.
<Experiment Results>
The molded article A and the molded article B were subjected to a bending test to obtain a flexural modulus and a flexural strength. The molded article A had a flexural modulus of 21.2 GPa and a flexural strength of 384 MPa. On the other hand, the molded article B had a flexural modulus of 14.8 GPa and a flexural strength of 304 MPa.

DISCUSSION

When the molded article was molded from the fiber-reinforced thermoplastic resin, it was found that strength increased by about 43% in the flexural modulus and about 26% in the flexural strength as compared with the related molding method when the molding method according to the present embodiment was carried out. Although an exact reason why the strength increased is unknown, the reinforcing fiber dispersed in the resin springs back, and a degree of impregnation of the reinforcing fiber with the resin decreased when molding is performed by the related molding method. On the other hand, springback may be prevented when molding was performed by the molding method according to the embodiment of the present invention. However, although dimensions of the molded article should be affected when a degree of springback is large, plate thicknesses of the molded article A and the molded article B were measured, but there was no difference in plate thickness. Even though the degree of springback is small, an influence on the strength may be large.

Although the present invention has been described in detail with reference to the specific embodiment, it is apparent to those skilled in the art that various changes and modifications can be made without departing from the spirit and scope of the present invention. The present application is based on Japanese Patent Application No. 2017-180833 filed on Sep. 21, 2017, contents of which are incorporated herein as reference.

REFERENCE SIGN LIST

1 Molding apparatus
2 Plasticizing device
4 Molding mold
5 Cooling mold
6 Carrying device
8 Heating cylinder
9 Screw
11 Hopper
12 Reinforcing fiber charge chute
14 Reinforcing fiber roll
15 Cutting device
17 First mold clamping device
18 Nozzle 20 Hand
22 Second mold clamping device

The invention claimed is:

1. A method of manufacturing a molded article formed of a fiber-reinforced thermoplastic resin, the method comprising:

kneading a thermoplastic resin and a reinforcing fiber;
molding a primary molded article from a predetermined amount of the fiber-reinforced thermoplastic resin by a molding mold;
opening the molding mold, taking out the primary molded article, transferring the primary molded article to a cooling mold and inserting the primary molded article into the cooling mold; and
compression cooling the primary molded article by the cooling mold,
wherein the kneading comprises kneading the thermoplastic resin with the reinforcing fiber in a heating cylinder of a plasticizing device to obtain the fiber-reinforced thermoplastic resin which has a first temperature, and
wherein the molding comprises molding the primary molded article from the predetermined amount of the fiber-reinforced thermoplastic resin injected from the plasticizing device by the molding mold which has a second temperature that is lower than the first temperature to obtain the primary molded article.

2. The method of manufacturing the molded article formed of a fiber-reinforced thermoplastic resin according to claim 1, wherein in the molding step, the fiber-reinforced thermoplastic resin is injected while the molding mold is opened, or a predetermined amount of the fiber-reinforced thermoplastic resin is inserted while the molding mold is opened, and thereafter molding is performed by compression molding.

3. A molding apparatus for molding a molded article formed of a fiber-reinforced thermoplastic resin, the molding apparatus comprising:

a plasticizing device comprising an extruder or an injection molding machine configured to knead the thermoplastic resin and the reinforcing fiber to obtain the fiber-reinforced thermoplastic resin;
a molding mold configured to mold a primary molded article from a predetermined amount of the fiber-reinforced thermoplastic resin;
a cooling mold configured to compress and cool the primary molded article; and
a carrying device configured to take out the primary molded article from the molding mold and carry the primary molded article to the cooling mold,
wherein the plasticizing device further comprises a heating cylinder configured to melt the thermoplastic resin to obtain the fiber-reinforced thermoplastic resin at a first temperature, and
wherein the molding mold is configured to mold the primary molded article at a second temperature that is lower than the first temperature.

4. The molding apparatus for molding a molded article formed of a fiber-reinforced thermoplastic resin according to claim 3,
wherein the molding mold comprises a mold for compression molding, and
wherein the predetermined amount of the fiber-reinforced thermoplastic resin is injected or inserted while the molding mold is opened, and is thereafter compressed by the molding mold.

5. A method of manufacturing a molded article formed of a fiber-reinforced thermoplastic resin, the method comprising:

kneading a thermoplastic resin and a reinforcing fiber;
molding a primary molded article from a predetermined amount of the fiber-reinforced thermoplastic resin by a molding mold;
opening the molding mold, taking out the primary molded article, transferring the primary molded article to a cooling mold and inserting the primary molded article into the cooling mold; and
compression cooling the primary molded article by the cooling mold,
wherein the molding of the primary article is carried out with a clamping pressure that is greater than a clamping pressure that is used to carry out the compression cooling.

6. The method of manufacturing the molded article formed of a fiber-reinforced thermoplastic resin according to claim 5, wherein the clamping pressure used to carry out the molding of the primary article is greater than 10 times the clamping pressure that is used to carry out the compression cooling.

7. A molding apparatus for molding a molded article formed of a fiber-reinforced thermoplastic resin, the molding apparatus comprising:

a plasticizing device comprising an extruder or an injection molding machine configured to knead the thermoplastic resin and the reinforcing fiber to obtain the fiber-reinforced thermoplastic resin;
a molding mold configured to mold a primary molded article from a predetermined amount of the fiber-reinforced thermoplastic resin;
a cooling mold configured to compress and cool the primary molded article; and
a carrying device configured to take out the primary molded article from the molding mold and carry the primary molded article to the cooling mold,
wherein the molding mold is configured to mold the primary article using a clamping pressure that is greater than a clamping pressure of which the cooling mold is configured to use.

8. The molding apparatus for molding a molded article formed of a fiber-reinforced thermoplastic resin according to claim 7, wherein the clamping pressure that the molding mold is configured to use is greater than 10 times the clamping pressure of which the cooling mold is configured to use.

* * * * *